United States Patent
Newell

[15] 3,648,398
[45] Mar. 14, 1972

[54] ADJUSTABLE AND RELEASABLE SINKER ADAPTED FOR ATTACHMENT TO FISHING LINE

[72] Inventor: Carl W. Newell, 635 Cavanagh Road, Glendale, Calif. 91207

[22] Filed: Jan. 19, 1970

[21] Appl. No.: 3,637

[52] U.S. Cl..............................43/43.12, 43/43.14, 43/44.97
[51] Int. Cl. .......................................................A01k 95/00
[58] Field of Search .................43/43.12, 17.2, 42.08, 42.49, 43/42.72, 44.89, 44.97

[56] References Cited

UNITED STATES PATENTS

| | | | |
|---|---|---|---|
| 2,841,911 | 7/1958 | Dahlgren | 43/43.12 |
| 2,519,104 | 8/1950 | Blomglen | 43/44.97 |
| 3,466,788 | 9/1969 | Potter | 43/44.97 X |
| 2,727,332 | 12/1955 | Benson | 43/44.97 |
| 1,322,706 | 11/1919 | Logeman | 43/44.97 |
| 2,267,285 | 12/1941 | McCrave | 43/42.72 |

Primary Examiner—Samuel Koren
Assistant Examiner—G. M. Yahwak
Attorney—Mahoney, Hornbaker & Schick

[57] ABSTRACT

A unitary tubular holder, preferably molded of resilient material such as plastic, has an attachment eye molded at one end thereof with the bore opening at the other end thereof. A preferably cylindrical weight is positioned in the holder bore open end preferably partially extending from the holder and expanding the holder for releasable gripping therebetween. The holder fastening eye may be attached to a fishing line and engagement of the weight by an exterior object will cause a release of the weight from the holder bore upon a force at the holder fastening eye.

1 Claim, 6 Drawing Figures

PATENTED MAR 14 1972 3,648,398
FIG. 1. FIG. 2. FIG. 3.
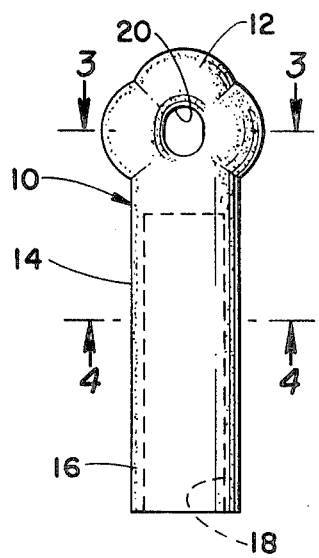
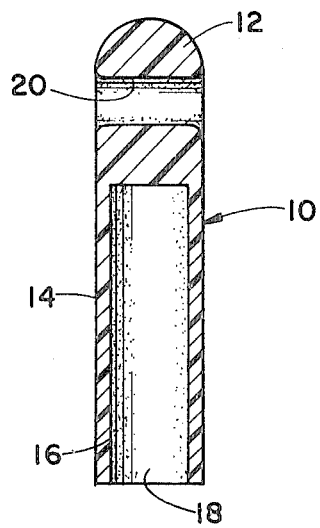
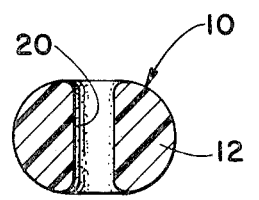
FIG. 4.
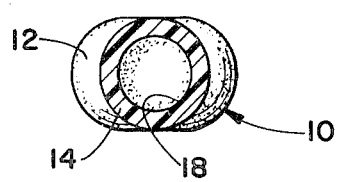
FIG. 5.
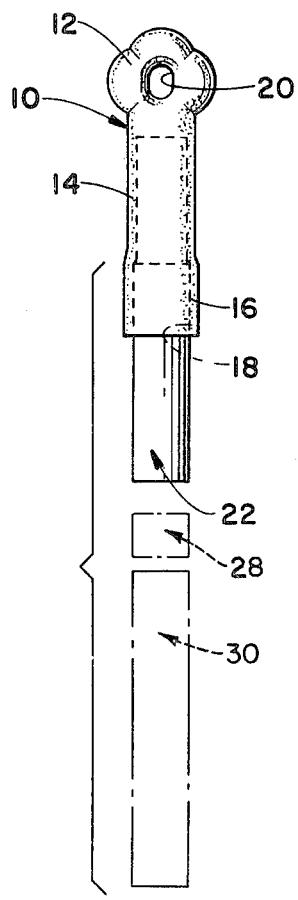
FIG. 6.
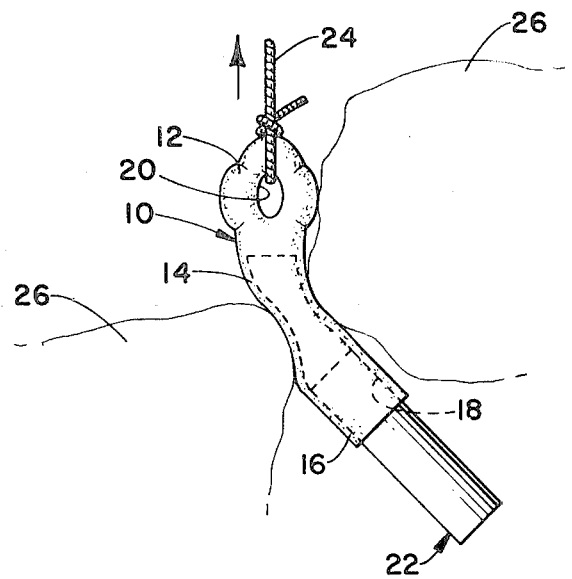
INVENTOR.
CARL W. NEWELL
BY MAHONEY, HORNBAKER
AND SCHICK
ATTORNEYS

ADJUSTABLE AND RELEASABLE SINKER ADAPTED FOR ATTACHMENT TO FISHING LINE

BACKGROUND OF THE INVENTION

This invention relates to an adjustable and releasable sinker adapted for attachment to a fishing line and more particularly, to such a sinker incorporating a releasable weight wherein the normal engagement or fouling of the sinker by an exterior object will cause a release of the weight upon a pulling force applied to the sinker, thereby releasing the remainder of the sinker from such engagement or fouling and confining the loss solely to the weight without a loss of the remainder of the sinker and any fishing line and other fishing equipment attached thereto. Even more particularly, this invention relates to a sinker adapted for attachment to a fishing line comprised of a flexible material holder having fastening means at one end thereof and having an internal bore opening at a generally opposite end thereof, said bore receiving a weight at least partially therein at said open end with the holder flexibly expanding to releasably grip said weight. Thus, with the sinker attached to a fishing line, the flexiblity of the holder permits the holder to distort and pass between exterior fouling objects while permitting the weight to be released therefrom in the event said weight is non-releasably engaged by said fouling objects. Furthermore, with certain soft, flexible materials for the holders, the fishing line can sever the holder attachment thereto, completely eliminating possibility of valuable equipment loss, even if the entire sinker is fouled.

It is well known to experienced fishermen that one of the inherent dangers involved with fishing is the loss of or damage to fishing tackle as a result of the fishing line becoming fouled on objects beneath the surface of the water, such as rocks, heavy weeds and similar objects. The most common fouling difficulty is occasioned by the fact that a weight must be attached at or near the end of a fishing line in order to retain the fishing bait or lure beneath the surface of the water and near the bottom. At the location of attachment of the weight to the fishing line, the weight will normally constitute the lowest point of the fishing line and will be dragged over objects projecting from the bottom such as rocks and heavy weeds.

The overall result is that the most frequent fouling of the fishing line is caused by the secure wedging of the weight between projecting rocks and other similar objects. It is then necessary to apply relatively heavy forces to the fishing line in an attempt to release such weight wedging engagement, many times resulting in an excess force sufficient to cause a separation of the fishing line and a loss of not only the wedge engaged weight but the fishing hooks and artificial fishing lures, all of which can be relatively expensive. Also, it is possible during the application of these excessive forces to the fishing line to damage valuable rods and reels even though the initial fouling cause is that of the weight which is of relatively minor expense.

Various prior forms of sinkers have heretofore been provided allegedly adapted for the release thereof from fouling objects, such as rocks and the like, merely by a pulling force being applied to the fishing line to which the sinkers are attached. Most of these prior releasable sinkers make use of some form of weakened separating attachment which will release the sinker or at least a portion thereof without requiring an excessive force which will break the fishing line. The major difficulty with these prior releasable sinkers is that they are not sufficiently positive of releasable action and the overall unit cost thereof is relatively high.

OBJECTS AND SUMMARY OF THE INVENTION

It is, therefore, an object of this invention to provide an adjustable and releasable sinker adapted for attachment to a fishing line wherein the release characteristics thereof are extremely positive of action, yet under normal use and non-fouling conditions the sinker remains properly operable for its usual intended purposes. According to the present invention, the sinker includes a separable flexible holder and weight, the holder flexibly gripping the weight for release therebetween upon that portion of the holder gripping the weight and the weight becoming fouled on an exterior object. With the holder attached to the fishing line, once the more bulky weight is released therefrom, the flexibility of the holder will permit the same to deform and disengage from said fouling so that the resulting loss is confined to the weight alone.

It is a further object of this invention to provide an adjustable and releasable sinker adapted for attachment to a fishing line having the foregoing advantageous attributes and releasable operation which is economical to fabricate, despite its highly efficient releasable operation. The holder of the sinker may be molded from relatively inexpensive plastics as a unitary part having a molded fastening eye at one end thereof an internal bore opening at the other end thereof, the weight being received in the holder bore opening end expanding the holder to provide gripping therebetween. Due to the flexibility and ready deformability of the plastic holder, this portion of the sinker is virtually impossible of secure fouling with an exterior object, so that once a sufficient force has been applied to disengage the gripping between the holder and weight, the holder including its attached fishing line is released. If the flexible holder should also become fouled, sufficient forces can cause severing of the soft holder fastening eye by the fishing line, thereby still releasing said line.

It is also an object of this invention to provide an adjustable and releasable sinker adapted for attachment to a fishing line of the foregoing general character wherein the overall weight of the sinker may be changed from time to time as desired in a quick and convenient manner for changing water conditions. With the attachment between the holder of the sinker and the weight thereof being a simple expansive gripping attachment, it is a simple operation to remove one weight from the holder and to insert a different weight therein to accomplish a change in desired weight characteristics. At the same time, this simple holder and weight attachment gives the advantage of fast holder and weight assembly for inserting a new weight immediately after a release of the sinker from a fouling engagement by the described quick release of the previously installed weight.

Other objects and advantages of the invention will be apparent from the following specification and the accompanying drawings which are for the purpose of illustration only.

BRIEF DESCRIPTION OF THE DRAWINGS

FIG. 1 is a side elevational view of an embodiment of holder for the adjustable and releasable sinker of the present invention;

FIG. 2 is a vertical sectional view of the holder of FIG. 1;

FIG. 3 is a horizontal sectional view looking in the direction of the arrows 3—3 in FIG. 1;

FIG. 4 is a horizontal sectional view looking in the direction of the arrows 4—4 in FIG. 1;

FIG. 5 is a reduced, side elevational view of the holder of FIG. 1 assembled with an embodiment of weight to complete the sinker of the present invention preparatory to attachment to a fishing line other lengths of weights being shown in phantom lines to illustrate alternate use of different length weights; and FIG. 6 is a side elevational view of the completed sinker of FIG. 5 attached to a fishing line and having a portion thereof engaged with rocks just prior to a release of the weight from the holder.

DESCRIPTION OF THE BEST EMBODIMENT CONTEMPLATED

Referring to FIGS. 1 through 5 of the drawings, the embodiment of sinker incorporating the principles of the present invention is shown as including an elongated, generally tubular holder generally indicated at 10 having a closed, slightly enlarged, first or fastening end 12, a reduced, generally cylindrical, intermediate portion 14 continuing into a generally cylindrical opposite or weight gripping end 16. A generally cylindrical bore 18 is formed in the holder 10 opening at the weight gripping end 16 and preferably extending substantially through the intermediate portion 14, but stopping short of the fastening end 12. Furthermore, the holder fastening end 12 is formed annular as viewed in side elevation so as to, in turn, form a fastening hole or eye 20 extending radially or transversely through the holder fastening end.

The holder 10 is formed of a flexible or stretchable material, preferably totally of a resilient material such as any of the common plastics, so as to be readily deformable while still having reasonable strength. At the same time, the resilient material may be soft enough for severing by a harder fishing line if sufficient forces are applied. Thus, the holder 10 is particularly adapted for being formed as a unitary, injection molded part and may be economically produced through normal injection molding processes. The walls formed by the bore 18 in the intermediate portion 14 and the weight gripping end 16 are relatively thin for proper expansible gripping qualities of the weight gripping end and relative ease of deformation of the intermediate portion for purposes to be hereinafter described, with the fastening end 12 being solid except for the fastening eye 20 to give strength of securement as will also be hereinafter described.

A weight generally indicated at 22 is preferably formed of a relatively heavy metal, such as lead, and is preferably cylindrical in configuration having a radial cross section a determined amount larger than the radial cross section of the holder bore 18. Thus, an end of the weight 22 may be forced into the open end of the bore 18 at the holder weight gripping end 16 with the remainder of the weight projecting from said bore open end and from the holder 10. During the insertion of the weight 22, the larger radial cross section thereof will cause outward stretching and resilient enlargement of the cross section of the holder bore 18 which will result in a firm peripheral gripping of the end of the weight 22 by the holder weight gripping end 16 to releasably retain the assembly as shown in FIG. 5. This completes the simple assembly of the sinker of the present invention and the sinker is ready for attachment to a fishing line 24 as shown in FIG. 6 at the desired location, usually spaced ahead of bait engaging hooks or artificial lures or extending directly from the hooks or lures.

During fishing, with the sinker of the present invention being used, when the sinker becomes engaged with an object beneath the water surface, for instance, wedged between rocks 26, as shown in FIG. 6, a pull on the fishing line 24 will cause the fastening end 12 and intermediate portion 14 of the holder 10 to readily deform in any manner necessary for becoming disengaged from such rocks, and when the holder weight gripping end 16 and the weight 22 are reached, continued pulling will cause the wedged engagement to force the weight endwise from the holder bore 18. Although the weight 22 will be lost, the holder 10 and the fishing line 24 will be saved, as well as the remaining fishing tackle attached thereto. Furthermore, the release of the weight 22 will not require a sufficient pulling force on the fishing line 24 which would cause damage to the attached fishing tackle. If the holder 10 is also firmly fouled, the harder fishing line 24 can sever the softer resilient material at the holder eye 20 and still prevent the loss or damage of the line and tackle.

Although other forms of weights could be used with the holder 10 or some comparable construction of said holder, such as spherical weights and the like, it is preferred to provide the weight 22 cylindrical as shown and to provide different axial lengths thereof, although all approximately the same cross section. Thus, where varying fishing conditions are encountered from time to time, it is a simple matter to remove a given weight and insert a new weight of different length and weighting characteristics such as the much smaller length weight 28 or the greater length weight 30, both shown in phantom lines in FIG. 5 and both having substantially the same cross section as weight 22. Also, with the sinker construction of the present invention, new weights 22 of the same or different length may be quickly inserted in the holders 10 when weights are lost as result of being caused to release from the holders for disengagement from rocks and the like.

According to the present invention, therefore, a simple construction of sinker is provided by the holder 10 and weight 22 which may be readily released by a relatively light pull on the fishing line 24 to which it is attached upon the sinker becoming inadvertently wedged or engaged with underwater obstructions such as the rocks 26, with the only loss being that of the relatively inexpensive weight 22, or at most the combined holder and weight as hereinbefore discussed. Furthermore, the releasable action of the sinker of the present invention is a positively acting release which will properly operate under virtually any fouling conditions, greatly improved over prior releasable sinker constructions. Still further, the overall sinker of the present invention may be economically provided in view of the holder 10 being a unitary, preferably injection molded, plastic part produced by conventional injection molding processes.

I claim:

1. In a sinker adapted for attachment to a fishing line, the combination of: an elongated unitary tubular holder molded of resilient material having a molded fastening eye formed at one end therefor for securement to a fishing line and having a generally uniform bore opening at an opposite end thereof, said elongated tubular holder being of generally uniform outer cross section from said molded fastening eye thereof throughout a remaining length thereof in said elongation and including said opposite end thereof; and an elongated weight in said holder bore adjacent said holder bore opening end peripherally engaged by said holder and projecting lengthwise from said holder opposite end, said weight being of generally uniform outer cross section throughout in said elongation and at a maximum not appreciably greater than said holder uniform outer cross section but greater than said holder bore, said peripheral engagement of said weight by said holder flexibly expanding said holder around said weight periphery and creating a releasable engagement of said weight within said holder bore; whereby, opposite forces on said holder fastening eye and said weight will cause a release of said weight from said holder bore, and said weight is normally removable and replaceable with weights of the same uniform outer cross section and of different elongation lengths.

* * * * *